US008789025B2

(12) United States Patent
O'Brien et al.

(10) Patent No.: US 8,789,025 B2
(45) Date of Patent: Jul. 22, 2014

(54) PATH-SENSITIVE ANALYSIS FOR REDUCING ROLLBACK OVERHEADS

(75) Inventors: John K. P. O'Brien, South Salem, NY (US); Kai-Ting Amy Wang, North York (CA); Mark Yamashita, Toronto (CA); Xiaotong Zhuang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 12/835,820

(22) Filed: Jul. 14, 2010

(65) Prior Publication Data

US 2012/0017203 A1 Jan. 19, 2012

(51) Int. Cl.
*G06F 9/45* (2006.01)

(52) U.S. Cl.
USPC ............ 717/140; 717/136; 717/151; 717/159

(58) Field of Classification Search
CPC .............. G06F 8/41; G06F 8/52; G06F 8/443
See application file for complete search history.

(56) References Cited

U.S. PATENT DOCUMENTS

| | | | | |
|---|---|---|---|---|
| 5,313,616 A | * | 5/1994 | Cline et al. | 717/127 |
| 5,551,043 A | | 8/1996 | Crump et al. | |
| 6,148,416 A | | 11/2000 | Masubuchi | |
| 7,089,537 B2 | | 8/2006 | Das et al. | |
| 7,254,806 B1 | * | 8/2007 | Yates et al. | 717/136 |
| 7,546,588 B2 | | 6/2009 | Dickenson | |
| 7,607,125 B2 | * | 10/2009 | Shinnar et al. | 717/140 |
| 7,707,562 B1 | * | 4/2010 | Kaltenbach | 717/136 |
| 7,861,237 B2 | * | 12/2010 | Tarditi et al. | 717/151 |
| 8,099,726 B2 | * | 1/2012 | Harris | 717/159 |
| 2006/0294507 A1 | | 12/2006 | Buskens et al. | |
| 2007/0136733 A1 | * | 6/2007 | Park et al. | 718/108 |
| 2007/0169030 A1 | * | 7/2007 | Tarditi et al. | 717/140 |
| 2007/0169031 A1 | * | 7/2007 | Harris | 717/140 |
| 2007/0186279 A1 | | 8/2007 | Zimmer et al. | |
| 2007/0226474 A1 | * | 9/2007 | Lee et al. | 712/228 |
| 2008/0155526 A1 | | 6/2008 | Gokhale | |

(Continued)

FOREIGN PATENT DOCUMENTS

| | | |
|---|---|---|
| JP | 3286230 A | 12/1991 |
| JP | 02009151603 | 7/2009 |
| WO | WO03102956 | 12/2003 |

OTHER PUBLICATIONS

F. Brandner, Precise simulation of interrupts using a rollback mechanism, Apr. 2009, 10 pages.*

(Continued)

*Primary Examiner* — Thuy Dao
(74) *Attorney, Agent, or Firm* — Stephen R. Tkacs; Stephen J. Walder, Jr.; William J. Stock

(57) ABSTRACT

A mechanism is provided for path-sensitive analysis for reducing rollback overheads. The mechanism receives, in a compiler, program code to be compiled to form compiled code. The mechanism divides the code into basic blocks. The mechanism then determines a restore register set for each of the one or more basic blocks to form one or more restore register sets. The mechanism then stores the one or more register sets such that responsive to a rollback during execution of the compiled code. A rollback routine identifies a restore register set from the one or more restore register sets and restores registers identified in the identified restore register set.

20 Claims, 6 Drawing Sheets

(56) References Cited

U.S. PATENT DOCUMENTS

2008/0162990 A1* 7/2008 Wang et al. .................. 714/19
2009/0037710 A1* 2/2009 Mavinakayanahalli
　　　　　　　　　　　　　　et al. ........................ 712/244
2009/0133032 A1　5/2009 Biles et al.

OTHER PUBLICATIONS

Bowen, Nicholas S. et al., "A Virtual Memory Translation Mechanism to Support Checkpoint and Rollback Recovery", IEEE, 1991, 10 pages.

Chow, F.C. et al., "Minimizing Register Usage Penalty at Procedure Calls", Proceedings of the ACM SIGPLAN 1988 conference on Programming Language Design and Implementation, Jun. 20-24, 1988, Atlanta, Georgia, United States, pp. 85-94.

Elnozahy, E.N. (Mootaz) et al., "A Survey of Rollback-Recovery Protocols in Message-Passing Systems", ACM Computing Surveys, vol. 34, No. 3, Sep. 2002, 44 pages.

Wang, Cheng et al., "Code Generation and Optimization for Transactional Memory Constructs in an Unmanaged Language", Proceedings of the International Symposium on Code Generation and Optimization, Mar. 11-14, 2007, pp. 34-48.

* cited by examiner

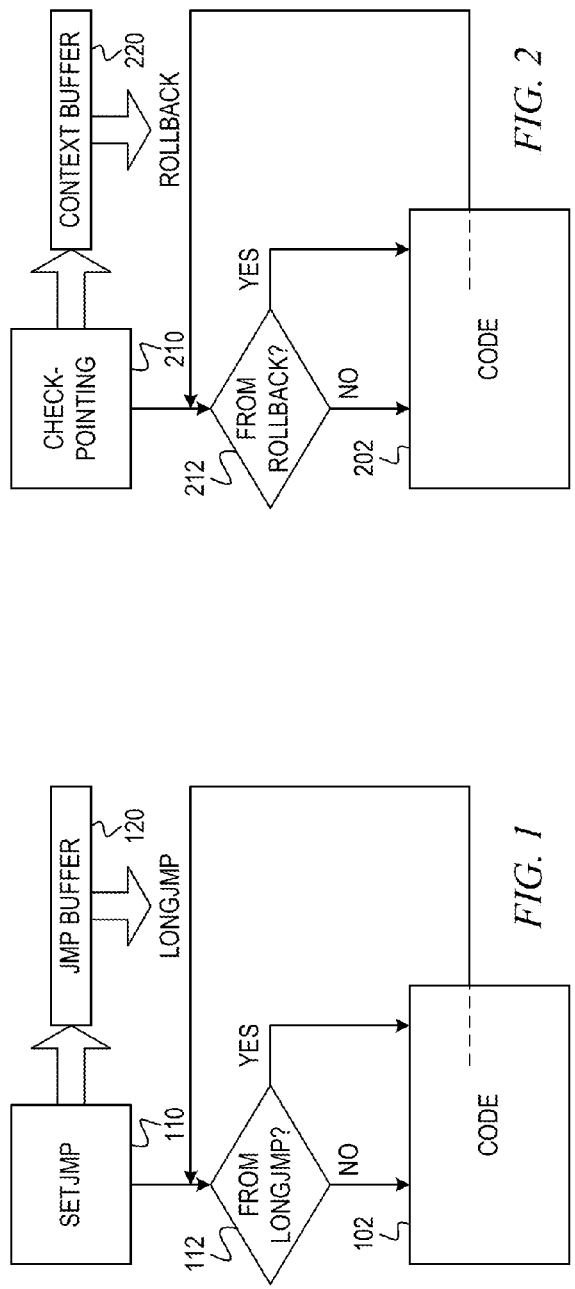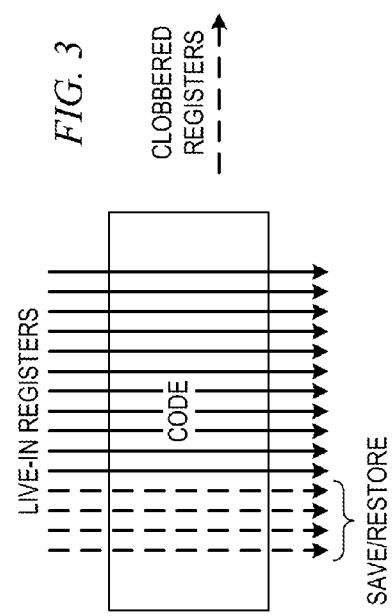

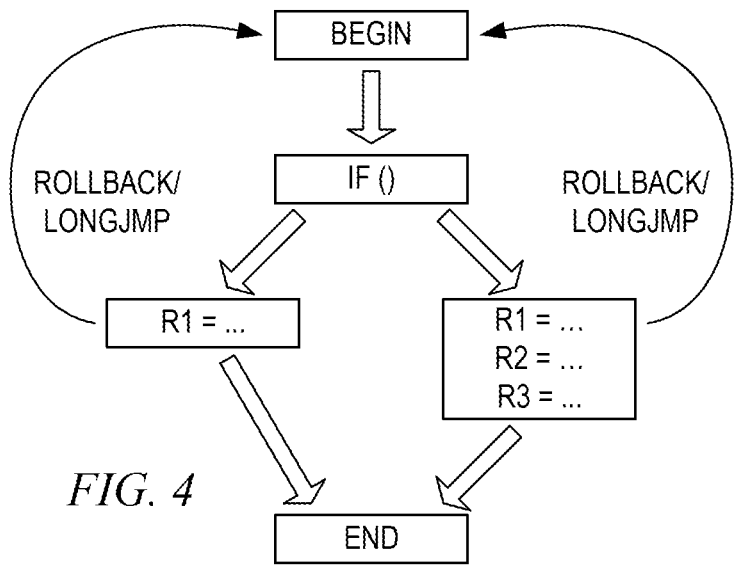
FIG. 4
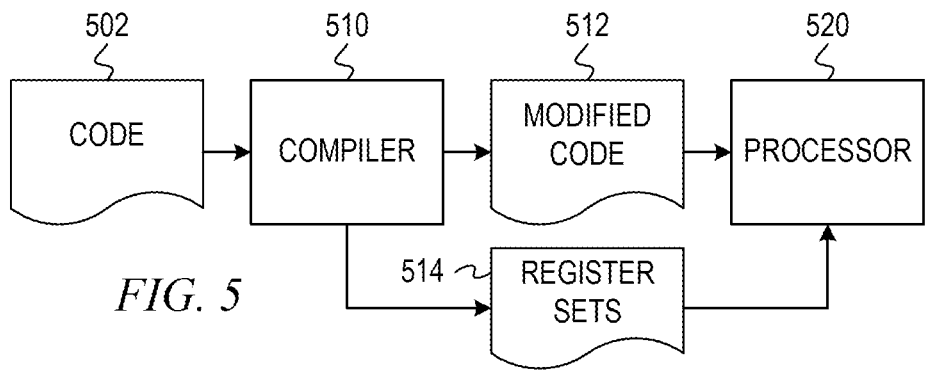
FIG. 5
FIG. 6
RES_SET(i), restore set at the end of basic block i, initially set to empty
Compute_Restore_Set is a forward dataflow algorithm that
iterates until all RES_SETs are stable.
for each basic block i do
  let begin_res_set= U (RES_SETs of all i's predecessors)
  RES_SET(i)=begin_res_set U registers that are clobbered in basic block i
od

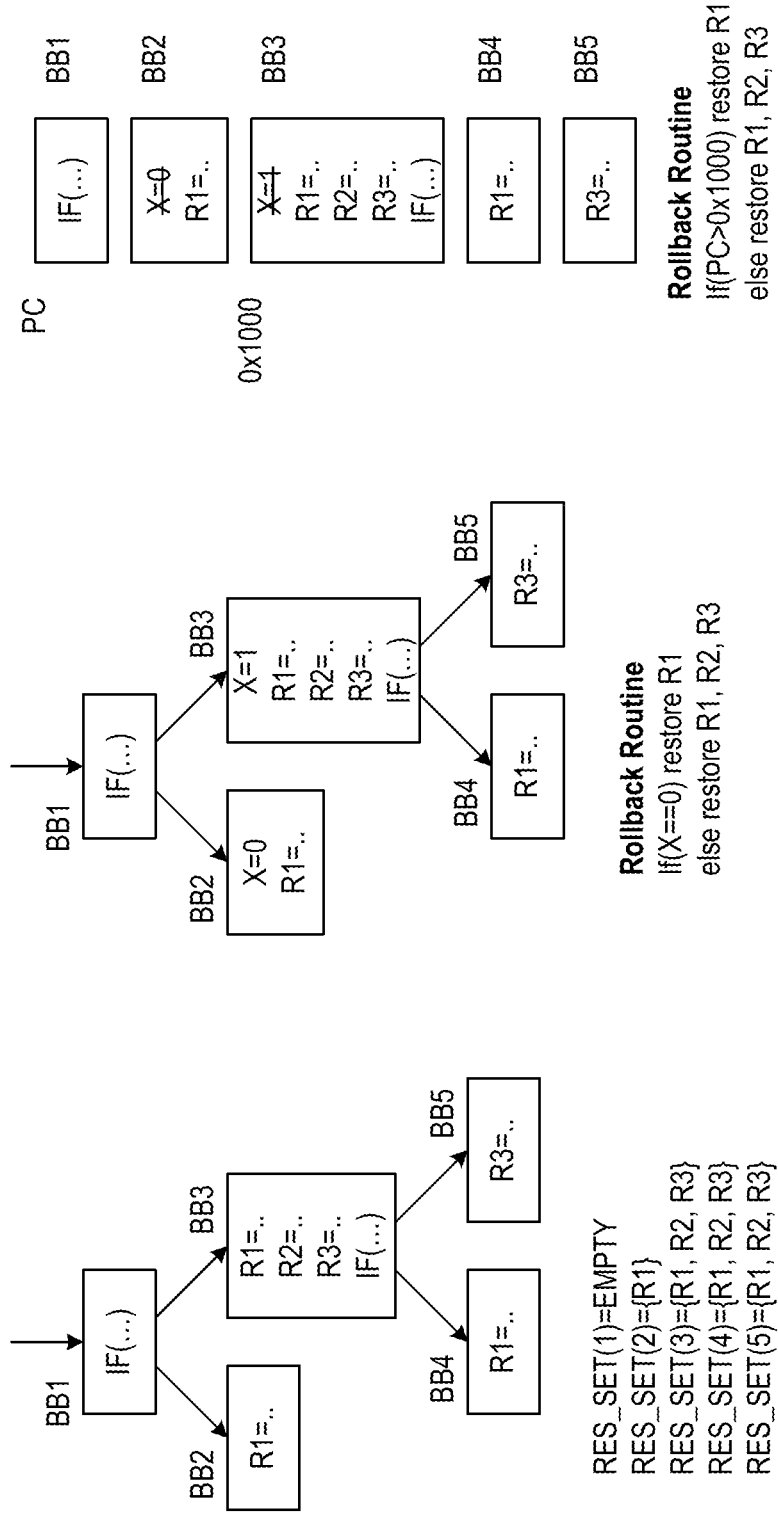

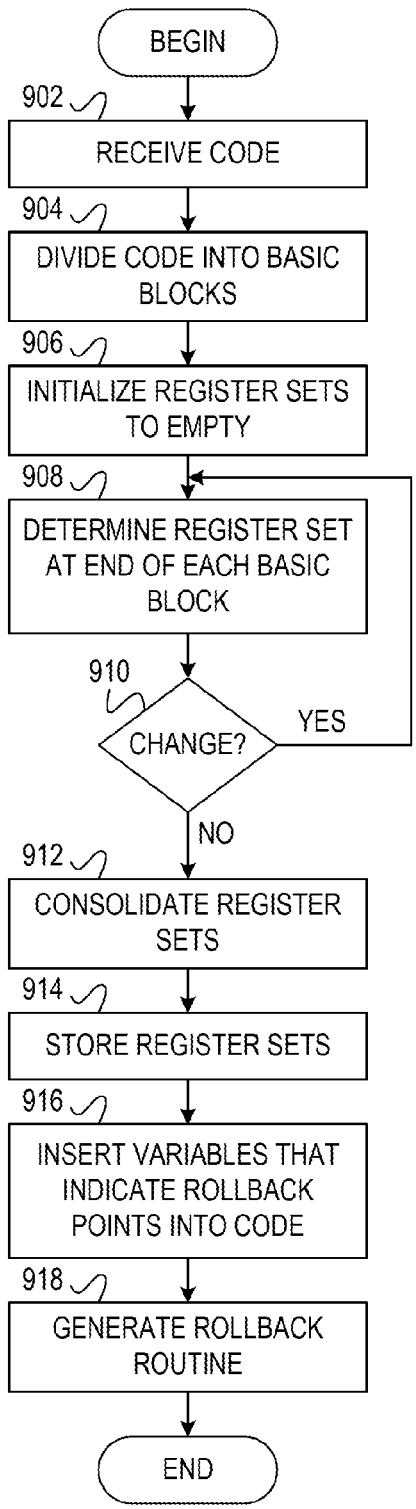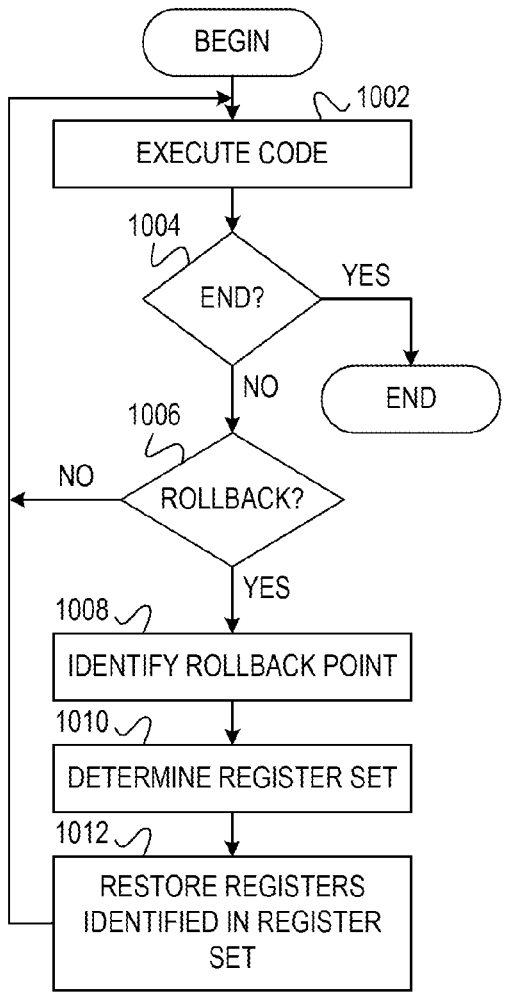

PATH-SENSITIVE ANALYSIS FOR REDUCING ROLLBACK OVERHEADS

This invention was made with United States Government support under Contract No. B554331 awarded by the Department of Energy. The Government has certain rights in this invention.

BACKGROUND

The present application relates generally to an improved data processing apparatus and method and more specifically to mechanisms for path-sensitive analysis for reducing rollback overheads.

The C programming language has a construct for complex flow control. The "setjmp" function saves the state of a program. The program state is completely defined by the set of registers and the contents of the memory. The "longjmp" function restores the state of the program. Prior to the call to setjmp, the program must save all volatile registers, and after the longjmp call, the program must restore all these registers. When a program changes the value of a register, the register is said to be "clobbered."

In the setjmp function itself, all non-volatile registers are saved to memory regardless of whether they are live at the time of the call. The same is true for the longjmp function, except that the longjmp function restores all non-volatile registers regardless of whether they have been altered since the call to setjmp.

The setjmp/longjmp functions are function calls within a program; therefore, one can predict when they will happen. On the other hand, a rollback happens when some event occurs outside of the program execution. The rollback restores the program state based on a checkpoint, which always saves all registers.

SUMMARY

In one illustrative embodiment, a method, in a data processing system, is provided for path-sensitive analysis for reducing rollback overheads. The method comprises receiving, in a compiler running in the data processing system, program code to be compiled to form compiled code and dividing, by the compiler, the program code into one or more basic blocks. The method further comprises determining, by the compiler, a restore register set for each of the one or more basic blocks to form one or more restore register sets. The method further comprises storing the one or more register sets such that responsive to a rollback during execution of the compiled code, a rollback routine identifies a restore register set from the one or more restore register sets and restores registers identified in the identified restore register set.

In other illustrative embodiments, a computer program product comprising a computer usable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein;

FIG. 1 is a block diagram that depicts a setjmp/longjmp implementation in which aspects of the illustrative embodiments may be implemented;

FIG. 2 is a block diagram that depicts a checkpoint/rollback implementation in which aspects of the illustrative embodiments may be implemented;

FIG. 3 illustrates code having a set of live-in registers with a subset of clobbered registers to be saved and restored in accordance with an illustrative embodiment;

FIG. 4 illustrates an example code execution having different paths with different register demand in accordance with an example embodiment;

FIG. 5 is a block diagram illustrating a mechanism for path-sensitive analysis for reducing rollback overheads in accordance with an illustrative embodiment;

FIG. 6 depicts example pseudo-code for path-sensitive analysis for reducing rollback overheads in accordance with an example embodiment;

FIGS. 8A-8C illustrate register consolidation and register restoration in accordance with illustrative embodiments;

FIG. 9 is a flowchart illustrating operation of a path-sensitive analysis mechanism in a compiler in accordance with an illustrative embodiment;

FIG. 10 is a flowchart illustrating operation of execution of a program with path-sensitive register restoration in accordance with an illustrative embodiment;

DETAILED DESCRIPTION

Figure 7A:
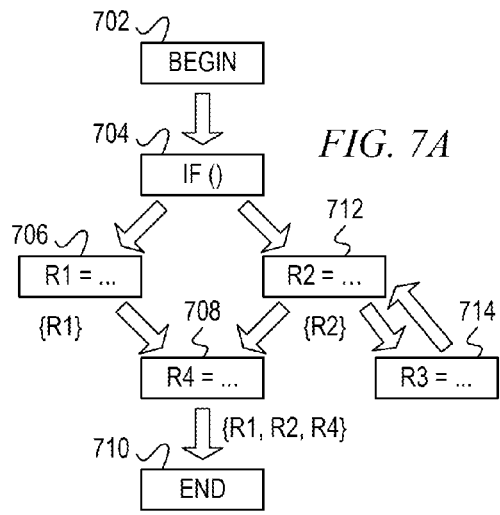
FIGS. 7A-7D depict an example of path-sensitive analysis in accordance with an illustrative embodiment.

The illustrative embodiments provide a mechanism for path-sensitive analysis for reducing rollback overheads. The mechanism reduces the amount of register saving/restoring during setjmp/longjmp or rollbacks for speculative execution. The mechanism receives code and divides the code into basic blocks. The mechanism then initializes a restore register set for each basic block to be empty. Then, the mechanism determines a restore register set for each basic block. First, the mechanism determines a begin restore register set for a given basic block by determining the union of all of the restore register sets for the basic blocks leading up to a given basic block, and then the mechanism determines a union of the begin restore register set and the set of registers that are clobbered in the given basic block. The mechanism then iterates through the program code determining the restore register set for each basic block until the restore register sets are not changed. Thereafter, the mechanism consolidates the restore register sets and inserts variables that indicate rollback points into the code.

Register demands along different paths the execution of the program are quite different. Therefore, the mechanism performs register restoration in a path-sensitive way. In accordance with the illustrative embodiments, a compiler includes a mechanism that performs data flow analysis to compute register restoration requirements for various program points. For setjmp/longjmp, because the point of rollback (longjmp) is known at compilation time, the data flow analysis works well. However, to further extend the benefits to interrupt induced rollbacks, the mechanism works with unknown rollback points.

FIG. 1 is a block diagram that depicts a setjmp/longjmp implementation in which aspects of the illustrative embodiments may be implemented. When the program code 102 calls setjmp function 110, the program stores the context information in jmp buffer 120. When program code 102 calls the longjmp function, the program restores the content of jmp buffer 120 and control goes to a point right after the setjmp function was called. The return value of setjmp also indicates whether the execution is from the longjmp or not (block 112).

During speculation, the mechanism is very similar to the setjmp/longjmp function pair, except that rollback can be triggered by an interrupt. Therefore, rollback occurs responsive to an event outside program execution rather than a longjmp call. FIG. 2 is a block diagram that depicts a checkpoint/rollback implementation in which aspects of the illustrative embodiments may be implemented. When the data processing system performs checkpoint 210, the data processing system stores the context information in context buffer 220. When a rollback occurs, the data processing system restores the content of context buffer 220 and control goes to a point in code 202 right after the checkpoint 210. The return value of the checkpoint 210 also indicates whether the execution is from the rollback or not (block 212).

In general, checkpointing/rollback overhead is not a significant concern, because rollbacks from a checkpoint rarely happen. However, rollback overhead could be significant for speculative execution, especially for code that could trigger frequent rollbacks. For example, thread level speculation could trigger many rollbacks if an old thread writes a value late but the value is used by many younger threads, which may result in many rollbacks with significant delay in execution.

Saving and restoring all registers could be excessive, because not all registers may be used by the code. One approach is to store registers selectively. For example, a mechanism may analyze register usage inside the code and only save and restore all live-in registers that are clobbered.

In accordance with an illustrative embodiment, the setjmp function 110 in FIG. 1 or checkpoint 210 in FIG. 2 may save and restore only those registers that have been clobbered. FIG. 3 illustrates code having a set of live-in registers with a subset of clobbered registers to be saved and restored in accordance with an illustrative embodiment. Register restoration is on the critical path, because every time a rollback occurs, a subset of all registers must be restored to allow re-execution. Treating all code as a whole, as in FIG. 3, could restore more registers than necessary.

FIG. 4 illustrates an example code execution having different paths with different register demand in accordance with an example embodiment. Assume the code contains an if-branch. The two paths clobber a different set of registers. Obviously, if a rollback occurs from the left-hand side branch, only one register (R1) must be restored. However, if a rollback occurs from the right-hand side branch, three registers (R1, R2, R3) must be restored.

FIG. 5 is a block diagram illustrating a mechanism for path-sensitive analysis for reducing rollback overheads in accordance with an illustrative embodiment. Compiler 510 receives code 502 and performs static analysis for path-sensitive register restoration. Compiler 510 analyzes code 502 statically and determines which registers should be restored. FIG. 6 depicts example pseudo-code for path-sensitive analysis for reducing rollback overheads in accordance with an example embodiment.

Compiler 510 divides code 502 into basic blocks based on branch paths. Compiler 510 may assume that longjmp is at the end of a basic block. For a longjmp that is in the middle of a basic block, compiler 510 may split the basic block. Initially, compiler 510 initializes a restore register set for each basic block to be empty. Then, compiler 510 determines a restore register set at the end of each basic block based on code 502. Compiler 510 iterates until all restore register sets are stable, i.e. no restore register set changes during two consecutive iterations of all basic block determinations.

During an iteration, for each basic block, the compiler performs a union operation on all predecessor restore register sets and then performs another union operation on that result and the set of registers clobbered in the current basic block, because this set contains all registers that are clobbered on the path from the entry point through the current basic block.

Unlike longjmps, a rollback may occur at many program points, which are not statically known. Some rollbacks may be triggered by specific events, such as memory access conflicts or buffer overflows. Events can be sent as interrupts, which might arrive very late. It is often possible to pinpoint the rollback point when an interrupt handler takes over. If this is the case, then the restore register set of the basic block to which the rollback point belongs can be used for register restoration.

For rollback points that are difficult to determine by the interrupt handler, certain variables may indicate the rollback point Thus, by reading such variables, the interrupt handler may determine which branch is being executed. If such variables are difficult to identify, compiler 510 may generate and insert variables into code 502 for this purpose. For example, as a naïve approach, compiler 510 may simply insert an instruction at the beginning of each basic block that gets assigned a unique value for its corresponding basic block. Thus, compiler 510 generates modified code 512.

The rollback routine must be modified to perform path-sensitive register restoration. The rollback routine (not shown) restores registers according to the location where execution stops, i.e. the rollback point. The program or interrupt handler tells the rollback routine information identifying the rollback point. The compiler generates rollback routine and provides the rollback routine as additional code.

In an arbitrary block of code, there may be many basic blocks, any of which may cause a rollback. Handling path-sensitive register restoration in a very fine granularity complicates register restoration. The rollback routine must have many branches to handle each specific ease. In accordance with one example embodiment, compiler 510 consolidates register restoration to merge restore register sets into a smaller number of categories such that the rollback routine can perform register restoration more efficiently.

Compiler 510 then stores the restore register sets 514. Compiler 510 then provides modified code 512 and the restore register sets 514 to processor 520.

FIGS. 7A-7D depict an example of path-sensitive analysis in accordance with an illustrative embodiment. As shown in FIGS. 7A-7D, path-sensitive analysis reveals that from the begin point 702, branch instruction 704 leads to a left path through instruction 706 and instruction 708 to end 710. The right path may lead through instruction 712 and instruction 708 to end 710; however, from instruction 712, the program may flow to instruction 714. From instruction 714, the program may flow back to instruction 712.

More particularly, as shown in FIG. 7A, path-sensitive analysis reveals that the program may flow from begin point 702 to branch instruction 704. From branch instruction 704, the program may flow through a left path through instruction 706 that clobbers register R1 and instruction 708 that clobbers register R4 to end 710. From branch instruction 704, the program may flow through a right path through instruction 712 that clobbers register R2 and instruction 708 that clobbers register R4 to end 710. The path-sensitive analysis then determines that the restore register set for instruction 706 includes register R1, because instruction 706 clobbers R1, and the restore register set for instruction 712 includes register R2, because instruction 712 clobbers R2. The path-sensitive analysis determines that the restore register set for instruction 708 includes registers R1, R2, and R4, because the union of the restore register sets of its predecessors (instructions 706 and 712) is R1 and R2 and the union of that set and the registers clobbered by instruction 708 is R1, R2, and R4.

Figure 7B:
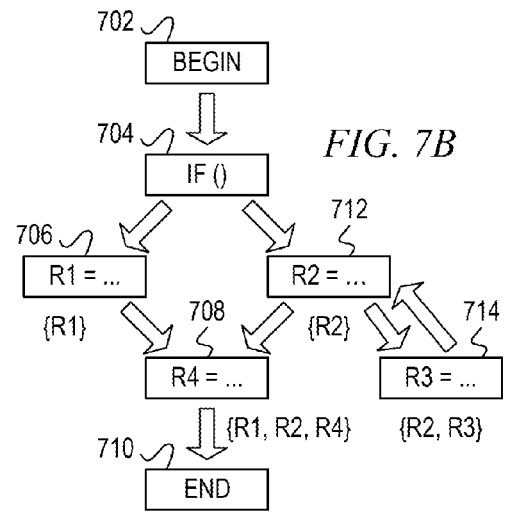

Turning to FIG. 7B, the program may flow from instruction 712 to instruction 714. Therefore, the restore register set of instruction 714 includes registers R2 and R3, because its predecessor clobbers R2 and instruction 714 clobbers R3.

Figure 7C:
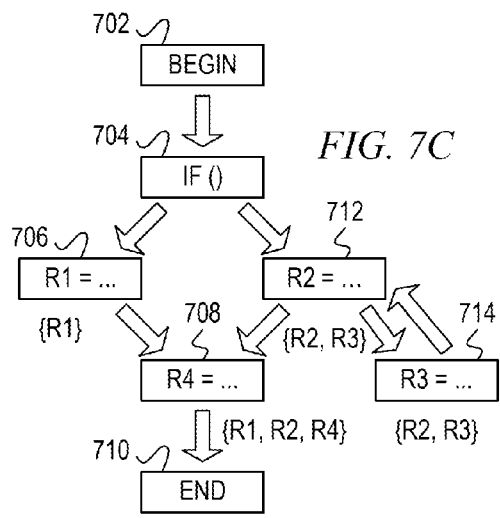

With reference now to FIG. 7C, the program may flow from instruction 714 back to instruction 712. The path-sensitive analysis then determines that the restore register set for instruction 712 includes registers R2 and R3, because the union of the restore register sets of its predecessor (instructions 704 (empty) and 714 (R2, R3)) is R2 and R3 and the union of that set and the registers clobbered by instruction 712 is R2 and R3.

Figure 7D:
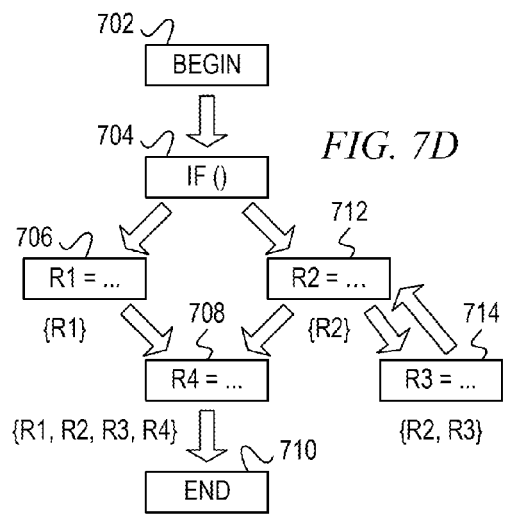

As shown in FIG. 7D, the program may flow from instruction 712 to instruction 708. The path-sensitive analysis determines that the restore register set for instruction 708 includes registers R1, R2, R3, and R4. The predecessors of instruction 708 are still instructions 706 and 712; however, the restore register set of instruction 712 changed in the last iteration. Thus, the union of the predecessors for instruction 708 is now R1, R2, and R3. The union of that set and the registers clobbered by instruction 708 is now R1, R2, R3, and R4.

FIGS. 8A-8C illustrate example register consolidation and register restoration in accordance with example embodiments. In FIG. 8A, the code contains five basic blocks: BB1, BB2, BB3, BB4, and BB5. The restore register sets are computed such that the restore register set for BB1 is empty, the restore register set for BB2 is {R1}, the restore register set for BB3 is {R1, R2, R3}, the restore register set for BB4 is {R1, R2, R3}, and the restore register set is {R1, R2, R3}. The restore register sets for BB3, BB4, and BB5 are the same. Therefore, the path-sensitive analysis mechanism of the illustrative embodiments may consolidate these three basic blocks together. In other words, if the rollback is from BB2, then the rollback routine restores R1, and if the rollback is from BB3, BB4, or BB5, then the rollback routine restores R1, R2, and R3.

FIG. 8B illustrates one example approach to let the rollback routine know the rollback point. The compiler may insert instructions to set a compiler-generated variable, X, to indicate whether the program is in BB2 or BB3-BB5. Then, the rollback routine checks the value of X to determine the restore register set.

FIG. 8C illustrates an alternative approach to let the rollback routine know the rollback point. If the code can be laid out properly and the program counter (PC) of the rollback point is known, then the rollback routine may check the PC to determine which register set to restore.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 9 is a flowchart illustrating operation of a path-sensitive analysis mechanism in a compiler in accordance with an illustrative embodiment. Operation begins, and the mechanism receives code for a program to be compiled (block 902). The mechanism divides the code into basic blocks (block 904) and initializes a restore register set for each basic block to be empty (block 906). In a first iteration, the mechanism determines a restore register set at the end of each basic block (block 908). As described above, the mechanism may determine the restore register set by performing a union operation on all predecessor restore register sets and then performing a union operation on that result and the set of registers clobbered in the current basic block, because this set contains all registers that are clobbered on the path from the entry point through the current basic block.

The mechanism then determines whether any restore register sets change in the iteration (block 910). In the first iteration, the restore register sets will change; therefore, operation returns to block 908 to determine the register set at the end of each basic block. The mechanism will repeat until the current iteration does not result in a change in the restore register sets in block 910.

If the restore register sets do not change in block 910, the mechanism consolidates the restore register sets, if possible (block 912). Then, the mechanism stores the register sets (block 914). The mechanism may insert variables that indicate rollback points into the code (block 916). Thereafter, the mechanism generates the rollback routine (block 918), and operation ends.

FIG. 10 is a flowchart illustrating operation of execution of a program with path-sensitive register restoration in accordance with an illustrative embodiment. Operation begins, and the processor executes code (block 1002). The processor determines whether an end of the program is reached (block 1004). If execution reaches the end of the program, then operation ends.

If the processor does not reach the end of the program in block 1004, then the processor determines whether a rollback occurs (block 1006). A rollback may occur when the code makes a longjmp call or due to an interrupt. If a rollback does not occur, then operation returns to block 1002 to execute the code.

If a rollback occurs in block 1006, a rollback routine identifies the rollback point (block 1008). As described above, the rollback routine may identify the rollback point based on a program counter or based on compiler-generated variables that indicate the rollback points in the code. The rollback routine then determines a restore register set for the identified rollback point (block 1010) and restores registers identified in the restore register set (block 1012). Thereafter, operation returns to block 1002 to execute the code from the beginning point in the code.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 11:
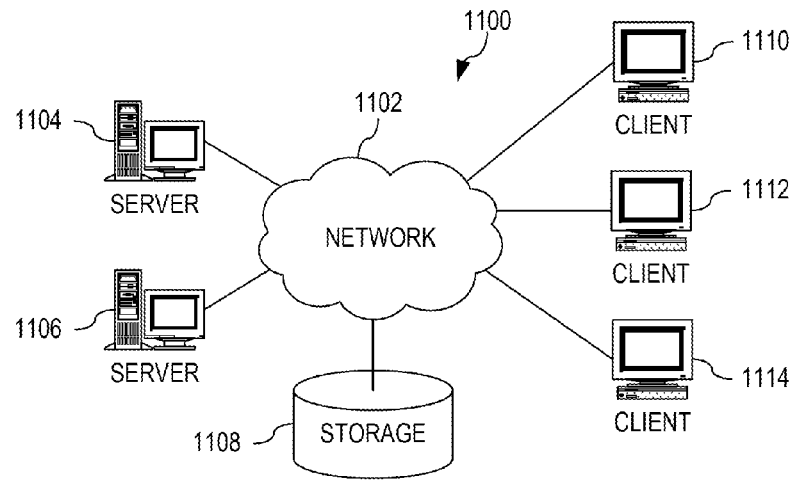
FIG. 11 depicts a pictorial representation of an example distributed data processing system in which aspects of the illustrative embodiments may be implemented.
Figure 12:
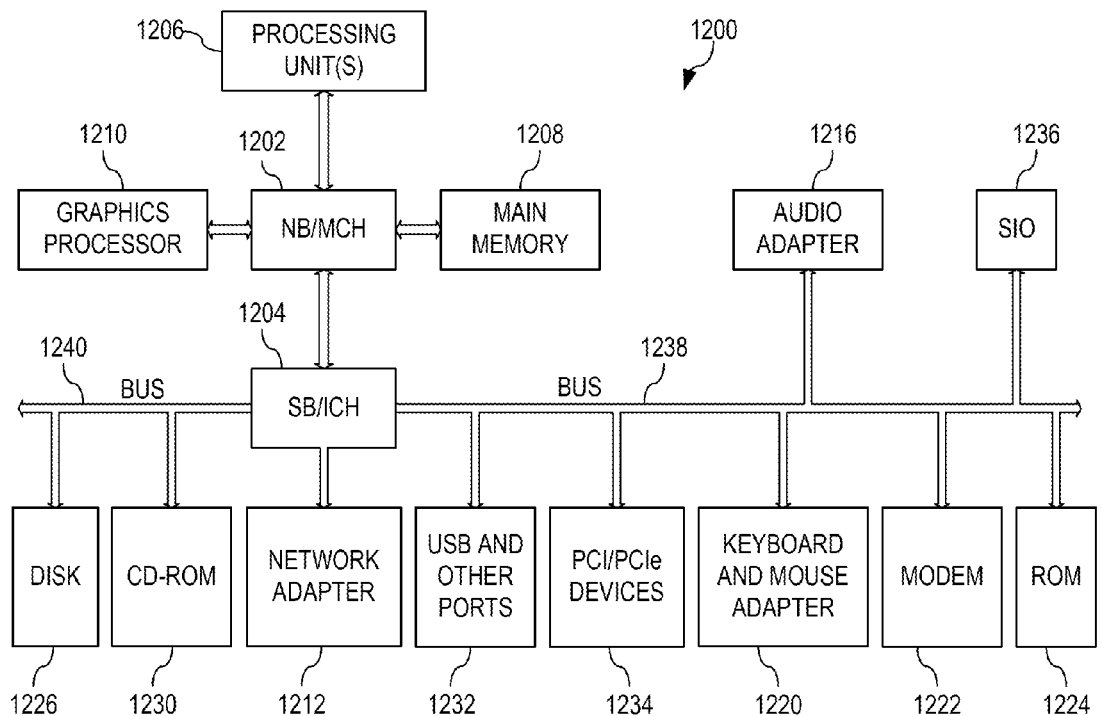
FIG. 12 is a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 11 and 12 are provided hereafter as example environments in which aspects of the illustrative embodiments may be implemented. While the description following FIGS. 11 and 12 will focus primarily on a single data processing device implementation, this is only an example and is not intended to state or imply any limitation with regard to the features of the present invention. To the contrary, the illustrative embodiments are intended to include distributed data processing environments and embodiments.

With reference now to the figures and in particular with reference to FIGS. 11 and 12, example diagrams of data processing environments are provided in which illustrative embodiments of the present invention may be implemented. It should be appreciated that FIGS. 11 and 12 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 11 depicts a pictorial representation of an example distributed data processing system in which aspects of the illustrative embodiments may be implemented. Distributed data processing system 1100 may include a network of computers in which aspects of the illustrative embodiments may be implemented. The distributed data processing system 1100 contains at least one network 1102, which is the medium used to provide communication links between various devices and computers connected together within distributed data processing system 1100. The network 1102 may include connections, such as wire, wireless communication links, or fiber optic cables.

In the depicted example, server 1104 and server 1106 are connected to network 1102 along with storage unit 1108. In addition, clients 1110, 1112, and 1114 are also connected to network 1102. These clients 1110, 1112, and 1114 may be, for example, personal computers, network computers, or the like. In the depicted example, server 1104 provides data, such as boot files, operating system images, and applications to the clients 1110, 1112, and 1114. Clients 1110, 1112, and 1114 are clients to server 1104 in the depicted example. Distributed data processing system 1100 may include additional servers, clients, and other devices not shown.

In the depicted example, distributed data processing system 1100 is the Internet with network 1102 representing a worldwide collection of networks and gateways that use the Transmission Control Protocol/internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 1100 may also be implemented to include a number of different types of networks, such as for example, an intranet, a local area network (LAN), a wide area network (WAN), or the like. As stated above, FIG. 11 is intended as an example, not as an architectural limitation for different embodiments of the present invention, and therefore, the particular elements shown in FIG. 11 should not be considered limiting with regard to the environments in which the illustrative embodiments of the present invention may be implemented.

With reference now to FIG. 12, a block diagram of an example data processing system is shown in which aspects of the illustrative embodiments may be implemented. Data processing system 1200 is an example of a computer, such as client 1110 in FIG. 11, in which computer usable code or instructions implementing the processes for illustrative embodiments of the present invention may be located.

In the depicted example, data processing system 1200 employs a hub architecture including north bridge and memory controller hub (NB/MCH) 1202 and south bridge and input/output (I/O) controller hub (SB/ICH) 1204. Processing unit 1206, main memory 1208, and graphics processor 1210 are connected to NB/MCH 1202. Graphics processor 1210 may be connected to NB/MCH 1202 through an accelerated graphics port (AGP).

In the depicted example, local area network (LAN) adapter 1212 connects to MACH 1204. Audio adapter 1216, keyboard and mouse adapter 1220, modem 1222, read only memory (ROM) 1224, hard disk drive (HDD) 1226, CD-ROM drive 1230, universal serial bus (USB) ports and other communication ports 1232, and PCI/PCIe devices 1234 connect to SB/ICH 1204 through bus 1238 and bus 1240. PCI/PCIe devices may include, for example, Ethernet adapters, add-in cards, and PC cards for notebook computers. PCI uses a card bus controller, while PCIe does not. ROM 1224 may be, for example, a flash basic input/output system (BIOS).

HDD 1226 and CD-ROM drive 1230 connect to SB/ICH 1204 through bus 1240. HDD 1226 and CD-ROM drive 1230 may use, for example, an integrated drive electronics (IDE) or serial advanced technology attachment (SATA) interface. Super I/O (SIO) device 1236 may be connected to SB/ICH 1204.

An operating system runs on processing unit 1206. The operating system coordinates and provides control of various components within the data processing system 1200 in FIG. 12. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 1200 (Java is a trademark of Sun Microsystems, Inc, in the United States, other countries, or both).

As a server, data processing system 1200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 1200 may be a symmetric multiprocessor (SMP) system including a plurality of processors in processing unit 1206. Alternatively, a single processor system may be employed.

Instructions for the operating system, the object-oriented programming system, and applications or programs are located on storage devices, such as HDD 1226, and may be loaded into main memory 1208 for execution by processing unit 1206. The processes for illustrative embodiments of the present invention may be performed by processing unit 1206 using computer usable program code, which may be located in a memory such as, for example, main memory 1208, ROM 1224, or in one or more peripheral devices 1226 and 1230, for example.

A bus system, such as bus 1238 or bus 1240 as shown in FIG. 12, may be comprised of one or more buses. Of course, the bus system may be implemented using any type of communication fabric or architecture that provides for a transfer of data between different components or devices attached to the fabric or architecture. A communication unit, such as modem 1222 or network adapter 1212 of FIG. 12, may include one or more devices used to transmit and receive data. A memory may be, for example, main memory 1208, ROM 1224, or a cache such as found in NB/MCH 1202 in FIG. 12.

Those of ordinary skill in the art will appreciate that the hardware in FIGS. 11 and 12 may vary depending on the implementation. Other internal hardware or peripheral devices, such as flash memory, equivalent non-volatile memory, or optical disk drives and the like, may be used in addition to or in place of the hardware depicted in FIGS. 11 and 12. Also, the processes of the illustrative embodiments may be applied to a multiprocessor data processing system, other than the SMP system mentioned previously, without departing from the spirit and scope of the present invention.

Moreover, the data processing system 1200 may take the form of any of a number of different data processing systems including client computing devices, server computing devices, a tablet computer, laptop computer, telephone or other communication device, a personal digital assistant (PDA), or the like, in some illustrative examples, data processing system 1200 may be a portable computing device which is configured with flash memory to provide non-volatile memory for storing operating system files and/or usergenerated data, for example. Essentially, data processing system 1200 may be any known or later developed data processing system without architectural limitation.

Thus, the illustrative embodiments provide mechanisms for path-sensitive analysis for reducing rollback overheads. The mechanism reduces the amount of register saving/restoring during setjmp/longjmp or rollbacks for speculative execution. The mechanism receives code and divides the code into basic blocks. The mechanism then initializes a register set for each basic block to be empty. Then, the mechanism determines a register set for each basic block. First, the mechanism determines a begin register set for a given basic block by determining the union of all of the register sets for the basic blocks leading up to a given basic block, and then the mechanism determines a union of the begin register set and the set of registers that are clobbered in the given basic block. The mechanism then iterates through the program code determining the register set for each basic block until the register sets are no changed. Thereafter, the mechanism consolidates the register sets and inserts variables that indicate rollback points into the code.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for path-sensitive analysis for reducing rollback overheads, the method comprising:
   receiving, in a compiler running in the data processing system, program code to be compiled to form compiled code;
   dividing, by the compiler, the program code into a plurality of basic blocks;
   determining, by the compiler, a restore register set for each of the plurality of basic blocks to form one or more restore register sets;
   storing, by the compiler, the plurality of restore register sets;
   inserting, by the compiler, a plurality of variables indicating rollback points into the compiled code;
   generating, by the compiler, a rollback routine;
   inserting the rollback routine into the compiled code to form modified code such that responsive to a rollback during execution of the compiled code, the rollback routine identifies a restore register set from the stored plurality of restore register sets based on the one or more variables and restores registers identified in the identified restore register set; and
   providing the modified code and the stored plurality of restore register sets to a processor for execution.

2. The method of claim 1, wherein dividing the program code into the plurality of basic blocks comprises dividing the program code based on at least one of a branch instruction or a longjmp call.

3. The method of claim 1, wherein determining the restore register set for a given basic block comprises:
   initializing the restore register set for the given basic block to be empty.

4. The method of claim 3, wherein determining the restore register set for the given basic block further comprises:
   determining a set of registers to be changed in the given basic block.

5. The method of claim 4, wherein determining the restore register set for the given basic block further comprises:
   performing a union operation on restore register sets for one or more predecessors of the given basic block to form a predecessor register set; and
   performing a union operation on the set of registers changed in the given basic block and the predecessor register set.

6. The method of claim 1, wherein determining restore register set for each of the plurality of basic blocks comprises:
   repeatedly performing path-sensitive analysis and determining the restore register set for each of the plurality of basic blocks until no restore register sets change.

7. The method of claim 1, wherein determining the restore register set for each of the plurality of basic blocks comprises:
   consolidating restore register sets having common sets of registers.

8. A computer program product comprising a non-transitory computer readable storage medium having a computer readable program stored therein, wherein the computer readable program, when executed on a computing device, causes the computing device to:
   receive, in a compiler running in the computing device, program code to be compiled to form compiled code;
   divide, by the compiler, the program code into a plurality of basic blocks;
   determine, by the compiler, a restore register set for each of the plurality of basic blocks to form a plurality of restore register sets;
   store, by the compiler, the plurality of register sets;
   insert, by the compiler, one or more variables indicating rollback points into the compiled code;
   generate, by the compiler, a rollback routine;
   insert the rollback routine into the compiled code to form modified code such that responsive to a rollback during execution of the compiled code, the rollback routine identifies a restore register set from the plurality of restore register sets based on the one or more variables and restores registers identified in the identified restore register set; and provide the modified code and the stored plurality of restore register sets to a processor for execution.

9. The computer program product of claim 8, wherein dividing the program code into the plurality of basic blocks comprises dividing the program code based on at least one of a branch instruction or a longjmp call.

10. The computer program product of claim 8, wherein determining the restore register set for a given basic block comprises:
   initializing the restore register set for the given basic block to be empty.

11. The computer program product of claim 10, wherein determining the restore register set for the given basic block further comprises:
   determining a set of registers to be changed in the given basic block;
   performing a union operation on restore register sets for one or more predecessors of the given basic block to form a predecessor register set; and
   performing a union operation on the set of registers changed in the given basic block and the predecessor register set.

12. The computer program product of claim 8, wherein determining the restore register set for each of the plurality of basic blocks comprises:
   repeatedly performing path-sensitive analysis and determining the restore register set for each of the plurality of basic blocks until no restore register sets change.

13. The computer program product of claim 8, wherein determining the restore register set for each of the plurality of basic blocks comprises:
   consolidating restore register sets having common sets of registers.

14. The computer program product of claim 8, wherein the computer readable program is stored in a computer readable storage medium in a data processing system and wherein the computer readable program was downloaded over a network from a remote data processing system.

15. The computer program product of claim 8, wherein the computer readable program is stored in a computer readable storage medium in a server data processing system and wherein the computer readable program is downloaded over a network to a remote data processing system for use in a computer readable storage medium with the remote system.

16. An apparatus, comprising:
   a processor; and
   a memory coupled to the processor, wherein the memory comprises instructions which, when executed by the processor, cause the processor to
   receive, in a compiler, program code to be compiled to for compiled code;
   divide, by the compiler, the program code into a plurality of basic blocks;
   determine, by the compiler, a restore register set for each of the plurality of basic blocks to for a plurality of restore register sets;
   store, by the compiler, the plurality of register sets;
   insert, by the compiler, one or more variables indicating rollback points into the compiled code;
   generate, by the compiler, a rollback routine;
   insert the rollback routine into the compiled code to form modified code such that responsive to a rollback during execution of the compiled code, the rollback routine identifies a restore register set from the plurality of restore register sets based on the one or more variables and restores registers identified in the identified restore register set; and
   provide the modified code and the stored plurality of restore register sets to a processor for execution.

17. The apparatus of claim 16, wherein dividing the program code into the plurality of basic blocks comprises dividing the program code based on at least one of a branch instruction or a longjmp call.

18. The apparatus of claim 16, wherein determining the restore register set for a given basic block comprises:
   initializing the restore register set for the given basic block to be empty;
   determining a set of registers to be changed in the given basic block;
   performing a union operation on restore register sets for one or more predecessors of the given basic block to form a predecessor register set; and
   performing a union operation on the set of registers changed in the given basic block and the predecessor register set.

19. The apparatus of claim 16, wherein determining the store register set for each of the plurality of basic blocks comprises:
   repeatedly performing path-sensitive analysis and determining the restore register set for each of the plurality of basic blacks until no restore register sets change.

20. A compiler apparatus having a processor and a memory storing executable instructions comprising:
   means for receiving program code to be compiled to form compiled code;
   means for dividing the program code into a plurality of basic blocks;
   means for determining a restore register set for each of the plurality of basic blocks to form a plurality of restore register sets;
   means for storing the plurality of register sets;
   means for inserting one or more variables indicating rollback points into the compiled code;
   means for generating a rollback routine; and
   means for inserting the rollback routine into the compiled code such that responsive to a rollback during execution of the compiled code, the rollback routine identities a restore register set from the plurality of restore register sets based on the one or more variables and restores registers identified in the identified restore register set.

* * * * *